United States Patent [19]

Tkac et al.

[11] Patent Number: 4,500,390
[45] Date of Patent: Feb. 19, 1985

[54] ELASTIC SCRAPER FOR HIGH-CAPACITY FILM DEVICE

[75] Inventors: Alexander Tkac; Jan Cvengros, both of Bratislava, Czechoslovakia

[73] Assignee: Slovenska vysoka skola technika, Bratislava, Czechoslovakia

[21] Appl. No.: 431,120

[22] Filed: Sep. 30, 1982

Related U.S. Application Data

[63] Continuation-in-part of Ser. No. 266,761, Jan. 22, 1981, abandoned.

[30] Foreign Application Priority Data

Feb. 4, 1980 [CS] Czechoslovakia .................... 721-80

[51] Int. Cl.³ .............................................. B01D 1/22
[52] U.S. Cl. .................... 159/6.1; 159/9 A; 159/11; 159/49; 159/11.2; 159/11.3; 202/236; 203/89
[58] Field of Search ............... 159/5, 9 R, 9 A, 11 R, 159/11 A, 11 B, 6.1, 6.2, 49; 203/89; 202/236

[56] References Cited

U.S. PATENT DOCUMENTS 3,190,817 6/1965 Neugebauer et al. ................ 159/6.2
3,395,419 8/1968 Nunlist et al. ........................ 159/6.2

Primary Examiner—Frank Sever

[57] ABSTRACT

Elastic scraper for high-capacity continuous molecular evaporation and reactors with a wiped-off film, the scraper being in the form of a plurality of wiping segments mounted upon a wiping device having a plurality of circumferentially spaced parallel supporting rods which rotate with respect to the surface of the apparatus from which the film is to be wiped. The wiping segments are held from above by an elastic spring which connected them to their respective supporting rods. The supporting rods may be floatingly mounted, as by connecting segments which are mutually joined whereby to provide the supporting rods and the wiping segments supported thereby with limited concumferential movement with respect to the surface to be wiped.

10 Claims, 5 Drawing Figures

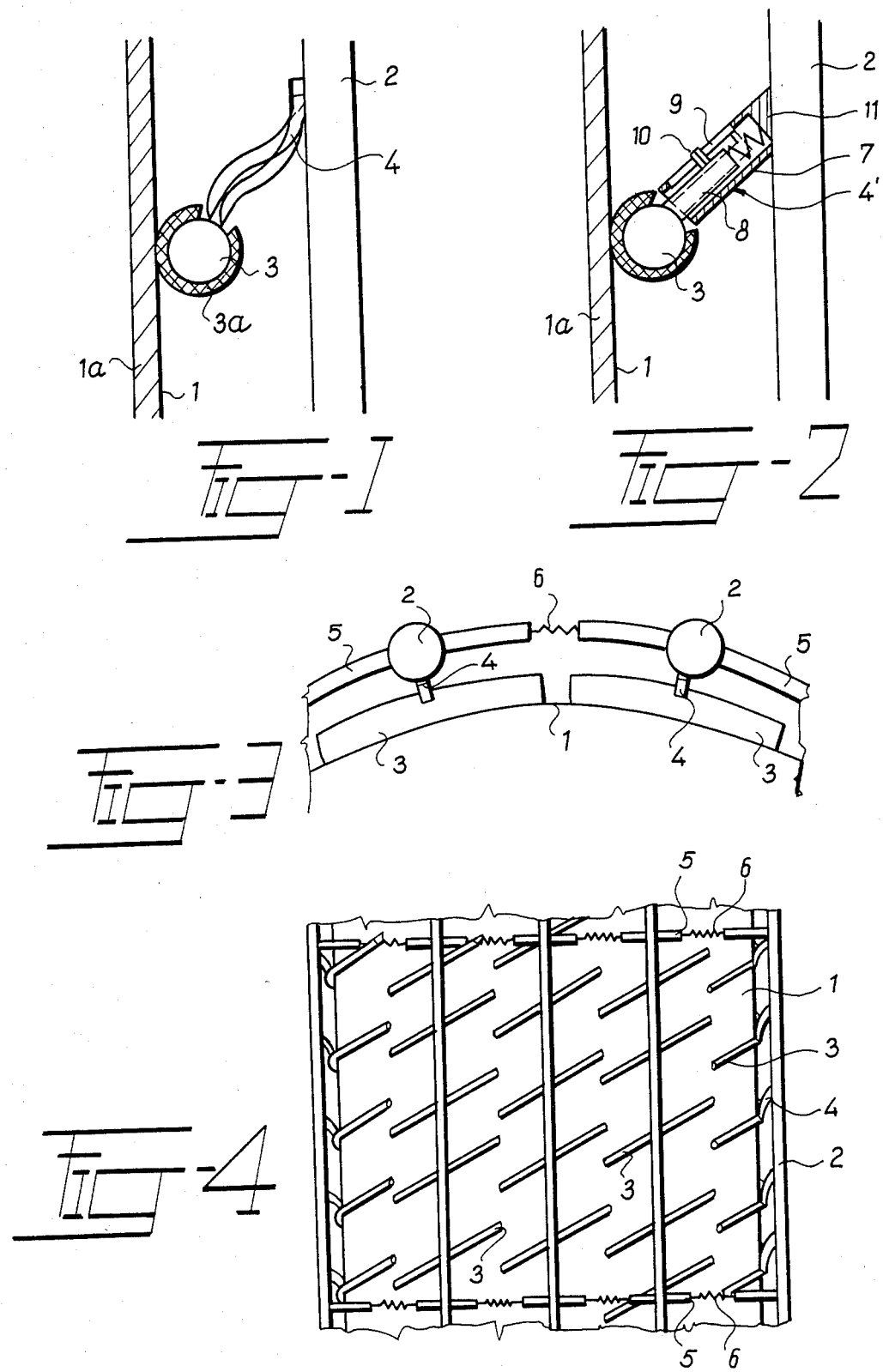

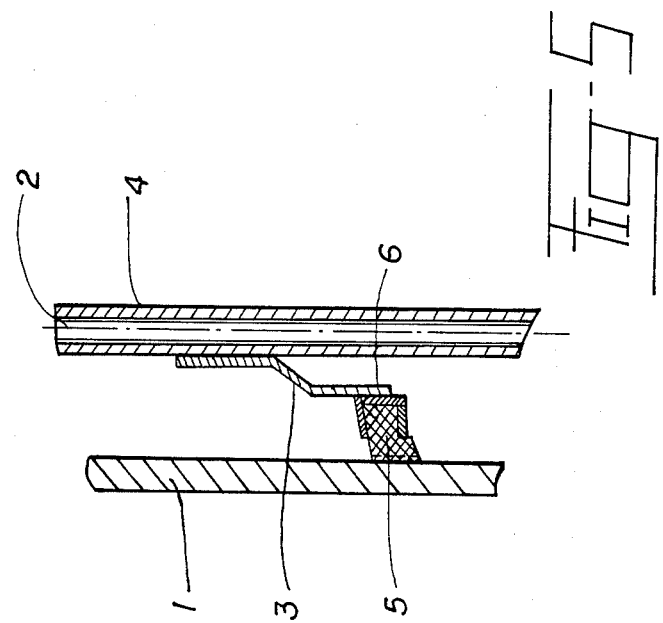

ELASTIC SCRAPER FOR HIGH-CAPACITY FILM DEVICE

This invention is a continuation-in-part of application Ser. No. 266,761, filed Jan. 22, 1981, now abandoned and is related to application Ser. No. 205,626, filed Nov. 10, 1980, now U.S. Pat. No. 4,334,952, and to application Ser. No. 205,269, filed Nov. 10, 1980, now U.S. Pat. No. 4,333,822.

This invention relates to an elastic scraper for a continuous molecular evaporator and a reactor with wiped off film, such evaporator or reactor having a convex evaporating surface formed on the outer cylindrical surface or frusto-conical surface having a large diameter, e.g. over 200 mm.

In the devices known up to now having a wiped off film with a convex evaporating surface, the scraper is constructed either in the form of a continuous helix or in the form of helical segments. A scraper in the form of a continuous helix, according to Czechoslovak Pat. No. 90,917, and German Pat. No. 1,448,166, is technically unrealizable in large production devices. Production of a helix with a large diameter from a wire of approximately 10 mm in diameter encounters production problems; the helix undergoes deformation changes especially as a result of thermal expansion, and the helix is not able to accomodate itself to smaller deviations of the heating body from a circular section. Under these circumstances, wiping of the whole heating surface cannot be ensured.

Further, a scraper in the form of a continuous helix closely ground in to the surface of the heating body does not permit the realization of a slowed down film when wiping off against the direction of natural film flow, the direction of rotation of a right-hand helix being to the right and the direction of rotation of a left-hand helix being to the right, or the scraper by its effect always accelerates the liquid film and helps it flow from a heating surface. A short dwell time of the film on the heating surface, a decreased intensity of film mixing, and poor heat and matter transfer result from such solution.

Scrapers are disclosed in Czechoslovak patent applications Nos. 114,714 and 181,054 in the form of a discontinuous metal helix, or in the form of helix segments placed in "Teflon" tubes, as a rule with the direction of rotation being opposite the direction of natural film flow, such scrapers ensuring the wiping off while keeping an optimum liquid dwell on the heating surface. The segments of the discontinuous helix with such scraper types are held on supporting rods which are placed in rotating rings; the segments together with the rods form a relatively rigid system rotating around the heating body. Relatively good concentricity of the heating body is required for this reason in order to ensure the satisfactory functioning of the scraper. With a large diameter of the heating body, e.g., around 1000 mm in high-capacity units, in which concentricity along the whole heating surface can hardly be guaranteed, zones with imperfect wiping off can occur on the heating surface as a result of the distortion (ovality) of the heating body.

In addition, with higher liquid loading of the heating body periphery, a partial overflow of liquid onto the supporting rods takes place at the places where the wiping segments are connected to the supporting rods, such liquid having accumulated before the wiping off of the segments. A part of the fed liquid is thus wrenched out of the thermal treatment in the film on the heating surface; this manifests itself disadvantageously in the decreased capacity of the film evaporator, in lessened separation efficiency, and, in the case of a film reactor, in lower conversion and worse selectivity.

The drawbacks of the prior art discussed above are overcome by the scraper according to the present invention, in which the wiping segments are held on the supporting rods by elastic couplings which include, for example, connecting springs.

The scraper according to the invention has several advantages when compared with prior scrapers. The elastic clamping of wiping segments allows their accomodation to smaller deviations of the heating body from an accurate circular section, and ensures defined wiping over the whole heated surface. This effect is made even more pronounced by the elastic joining of single supporting rods. Liquid overflow over a segment onto its supporting rod is eliminated by holding the wiping segment by its upper half, the elastic coupling being directed upwardly. The provision of an elastic holding of a wiping segment allows a small distance, e.g. 30–40 mm to be maintained between the evaporating and condensing surface with a sufficient mechanical resistance; this is important in the case of molecular evaporators.

The invention will be more fully understood upon consideration of the accompanying drawings in which:

FIG. 1 is a schematic view partially in elevating and partially in section of a first embodiment of wiping scraper segment in accordance with the invention;

FIG. 2 is a similar view of a second embodiment of wiping scraper segment according to the invention;

FIG. 3 is a fragmentary view in plan showing the elastic coupling of wiping segments each of which is supported on a single rod;

FIG. 4 is a schematic view in developed form of the structure shown in FIG. 3, the view being taken in the direction from top to bottom in FIG. 3; and FIG. 5 is a view similar to FIG. 1 of a third embodiment of wiping scraper segment in accordance with the invention.

Turning first to FIG. 1, in such figure the righthand surface 1 of a heating means 1a is shown being wiped by a wiping segment 3. The outer portion 3a of wiping segment 3 is advantageously covered with a Teflon tube 3a which closely engages the heating surface 1. Segment 3 is held from above by an elastic coupling 4 which is fixedly secured at its upper end to a vertical supporting rod 2 and at its lower end to the inner body of the wiping segment 3. The body of the wiping 3, and the rod 2, may be made of metal, the elastic coupling 4 may be made of metal bands, and the opposite ends of the coupling 4 may be secured by welding to the rod 2 and the body of the wiping segment 3.

The longitudinal axis of the wiping segment 3 is disposed at an angle of from 10°–45° with respect to the longitudinal axis of the supporting rod 2. This relationship is shown in FIG. 4, wherein another embodiment of the invention is illustrated. Also, as shown in FIG. 4, a number of wiping segments in the embodiment of FIG. 1 are mounted in spaced parallel relationship on a single supporting rod 2. The wiping segments on each two adjoining supporting rods are mutually conveniently shifted longitudinally of their respective rods. Also, as shown in FIG. 4, to ensure the effective wiping of the full surface 1. In FIG. 1 the elastic coupling 4 is advantageously made of bent steel strips.

A second embodiment of wiper is shown in FIG. 2, wherein parts which are smaller to those shown in FIG. 1 are designated by the same reference characters. In the embodiment of FIG. 2, the elastic coupling 4 of FIG. 1 is replaced by a cylinder and piston arrangement. A cylinder 7, which inclines downwardly from supporting rod 2 toward the heating surface 1, is rigidly connected at its upper end to rod 2. A piston 8 having a diameter marginally less than that of the inner diameter of the cylinder is loosely guided thereby and is held from rotation with respect to the cylinder by a radially direct pin 10 affixed to the piston, the pin being slidingly received within a longitudinal slot 9 in the upper wall of the piston. The wiping segment 3 is constantly resiliently urged into engagement with the surface 1 by a coil compression spring 11, which abuts the closed upper end of the cylinder 7 on the one end and the inner end of the piston 8 on the other. It will be seen that the cylinder 7, the piston 8, the guiding means therebetween, and the spring 11 constitute an elastic coupling, generaly designated 4'. This, like the elastic coupling 4 in FIG. 1, constantly resiliently presses the wiping segment 3 against the surface 1.

In the embodiment of the device shown in FIGS. 3 and 4, each of the spaced parallel vertical supporting rods 2 has affixed thereto a connected segment 5 at each one of a plurality of locations (two shown) longitudinally of the rods 2. The connecting segments 5 in each set thereof are disposed in alignment perpendicular to the longitudinal axis of the rods 2 with the confronting ends of the connecting segments 5 being spaced from each other and connected by coiled compression springs 6. As shown in FIG. 3, the connecting segments 5 are disposed radially outwardly of the wiping segments 3, and are disposed coaxial of segments 3.

It will thus be seen that in the embodiment of FIGS. 3 and 4 the supporting rods 2 are floatingly mounted and are capable of limited movement in a direction which is horizontal in FIG. 4 but is actually in a circumferential direction in FIG. 3. Such freedom of the supporting rods 2, taken with the flexibility of mounting of the wiping segments 3 afforded by the elastic coupling 4 of FIG. 1 or the elastic coupling 4' of FIG. 2 permits the wiping segments 3 faithfully to follow the surface 1 as the supporting rods 2 and the wiping segments carried thereby rotate with respect to such surface 1. It is to be understood that the means for driving the rods 2, the connecting segments 5, and the wiping segments 3 about the axis of the heating member 1a is such as to permit the described freedom of movement of the rods 2 with respect to each other which is afforded by the resilient connection 6 between successive connecting segments 5.

The invention also relates to a scraper with swinging wiping segments for short-path evaporator and a film reactor with wiped off film with convex evaporation surface formed at the outer evaporation cylinder surface.

The scraper in short-path evaporator ensures at its rotary motion uniform distribution of distilled liquid at the whole evaporation surface and intensive mixing of the liquid. According to the Czechoslovak Patent Specification Nos. 114 714 and 181 054 a scraper for short-path evaporator is known having convex evaporation surface in the form of discontinuous metallic helix or in the form of helix segments placed in Teflon tubes, single wiping segments being held directly at supporting rods what forms relatively rigid system rotating around heating body. Regular function of scraper is however achieved only at relatively good roundness of the heating cylinder. In the case of large diameters of heating cylinder around 1000 mm in high-capacity units the required roundness along the whose evaporation surface can be hardly guaranteed. Besides it at higher liquid loading of heating cylinder periphery partial overflow of liquid onto supporting rod takes place at the place of holding of wiping segment to supporting rod. Wiping segment of the scrapers with segment holding at supporting rod from the above through an elastic coupling has, according to the Czechoslovak Author's Certificate No. PV 721-80, free motion in the plane perpendicular to the cylinder axis, free motion around the axis of supporting rod is however impossible. This fact can be the cause of non-uniform pressing of the wiping segment and of its abrasion. The exchange of worn out or damaged wiping segment is laborious.

These drawbacks are eliminated with the scraper with swinging wiping segment for short-path evaporator and film reactor shown in FIG. 5. Such scraper is formed by supporting rods located around the perimeter of a heating cylinder with a system of wiping segments and elastic couplings according to the invention, the distinguishing feature of which is that every wiping segment of the scraper, held in a retainer such as a trough, is held by an elastic coupling upon a guiding tube which is movably supported upon the supporting rod.

The scraper according to the invention has several advantages as related to the preceding types. Above all it keeps the advantageous properties which are connected with the holding of every wiping segment by an elastic coupling which enables its adaptation to smaller deviations of heating cylinder from accurate round section by what defined wiping at the whole evaporation surface is achieved. A new degree of freedom is achieved by holding wiping segment through an elastic coupling at guiding tube freely rotating upon supporting rod, whereby natural fitting of wiping segment to the heating surface is achieved without stress and non-uniform pressing of the segment and its abrasion is eliminated. Any necessary exchange of the wiping segment is simple. A system of condensation surfaces for micro-overflow capture according to the Czechoslovak Patent Specification No. 114 756 can be held at the scraper with swinging wiping segments according to the invention.

Turning now to FIG. 5, a wiping segment 5 tightly held in a trough 6 is held through an elastic coupling 3 upon a guiding rube 4 freely rotatably upon a supporting rod 2. A whole series of guiding tubes 4 with elastic couplings made for example of springy metal, troughs 6 and wiping segments 5, as in the embodiments of FIGS. 1-4, incl., is thus put on one supporting rod 2. The whole scraper for a short-path evaporator is formed by several supporting rods 2 uniformly angularly spaced about the perimeter of a heating cylinder. Wiping segment 5 is as a rule made of PTEP and it tightly conforms to the heating surface 1. As a rule it has a shape of an L-section rod with one edge cut so as to ensure an areal contact with the heating surface 1 on the one hand, further to provide the possibility of forming a reservoir of liquid in front of the wiping segment 5, and finally to provide its advantageous location in the profiled trough 6. The trough 6 is metallic as a rule, it has the shape of a segment of a helix and it increases the mechanical strength of the wiping segment 5. Wiping segment 5 has several cuts for liquid outflow at the side of its contact with the heating surface 1. The trough 6 together with wiping segment 5 is tipped through an angle 10° to 45° with respect to the axis of the supporting rod 2 and guiding tube 4.

Although the invention is illustrated and described with reference to a plurality of embodiments thereof, it is to be expressly understood that it is in no way limited to the disclosure of such preferred embodiments but is capable of numerous modifications within the scope of the appended claims.

We claim:

1. An elastic scraper for a high-capacity film device having a liquid heating means in the form of a shell with a circular cross-section, said shell having a circular cylindrical heating surface on which there is formed a liquid film which is wiped by said scraper, the scraper comprising a plurality of supporting rods with wiper segments mounted thereon, the wiping segments being held from above on their respective supporting rod, an elastic coupling connected at its upper end to the supporting rod and at its lower end to the wiping segment and means for mounting said scraper in said high-capacity film device.

2. The combination of claim 1, wherein the supporting rods are mounted for liminted floating movement circumferentially of the heating surface, and the supporting rods are provided with aligned connecting segments the confronting ends of which are spaced, and coiled compression springs interposed between the confronting ends of successive connecting segments.

3. The combination in accordance with claim 1, wherein the elastic coupling comprises a cylinder mounted inclined with respect to its respective supporting rod, the upper end of the cylinder being connected to the cylinder rod, and the lower end of the cylinder connecting a piston loosely slidable therein, and a coil compression spring disposed between the upper end of the cylinder and the upper end of the piston whereby resiliently to thrust the wiping segment against the heating surface.

4. The combination according to claim 3, wherein the cylinder is provided with a longitudinally extending slot, and comprising a guiding pin disposed on the piston radially thereof and slidable within said slot.

5. The combination of claim 1, wherein he elastic coupling comprises a single resilient elongated member extending between and connected to a respective rod and a trough in which the scraper is mounted.

6. The combination of claim 5, wherein the resilient elongated member is made of springy metal.

7. An elastic scraper for a high-capacity film device having a liquid heating means in the form of a shell with a circular cross-section, said shell having a vertical circular cylindrical heating surface on which there is formed a liquid film which is wiped by said scraper, the scraper comprising a plurality of vertical supporting rods spaced angularly about the heating surface, wiping segments mounted on the supporting rods, the wiping segments being held from above on their respective supporting rod, an elastic coupling connected at its upper end to the supporting rod and at its lower end to the wiping segment and means for mounting said scraper in said high-capacity film device.

8. The combination of claim 7, wherein the elastic coupling encompasses a single resilient elongated member extending between and connected to a respective rod, and a trough at the bottom of the elongated member in which the scraper is mounted.

9. The combination of claim 8, wherein the resilient elongated member is made of springy metal.

10. The combination of claim 7, comprising a plurality of vertically spaced wiper segments mounted upon each supporting rod.

* * * * *